United States Patent [19]
Pavel

[11] Patent Number: 6,046,125
[45] Date of Patent: Apr. 4, 2000

[54] METHODS FOR ENHANCING THE ACID SITES OF FCC CATALYSTS

[75] Inventor: Stephen K. Pavel, Kingwood, Tex.

[73] Assignee: Coastal Catalyst Technology, Inc., Houston, Tex.

[21] Appl. No.: 09/055,690

[22] Filed: Apr. 6, 1998

[51] Int. Cl.[7] .............................. B01J 20/34; B01J 38/60
[52] U.S. Cl. ............................................. 502/27; 502/22
[58] Field of Search ........................................ 502/22, 27

[56] References Cited

U.S. PATENT DOCUMENTS

| | | | |
|---|---|---|---|
| 3,122,510 | 2/1964 | Burk, Jr. et al. | 252/413 |
| 3,122,511 | 2/1964 | Foster | 252/413 |
| 3,147,228 | 9/1964 | Erickson et al. | 252/412 |
| 3,150,104 | 9/1964 | Lehman | 252/415 |
| 3,182,025 | 5/1965 | Simantel | 252/415 |
| 3,219,586 | 11/1965 | Erickson | 252/415 |
| 4,101,444 | 7/1978 | Burk et al. | 252/411 |
| 4,163,709 | 8/1979 | Burk et al. | 208/120 |
| 4,163,710 | 8/1979 | Burk et al. | 208/120 |
| 4,243,550 | 1/1981 | Burk et al. | 252/412 |
| 4,686,197 | 8/1987 | Elvin | 502/22 |

*Primary Examiner*—John F. Niebling
*Assistant Examiner*—Alexander G. Ghyka
*Attorney, Agent, or Firm*—Browning Bushman

[57] ABSTRACT

The present invention discloses aqueous methods for enhancing the acid sites of fluid catalytic cracking (FCC) catalysts. The methods comprise the steps of contacting an FCC catalyst, either spent or fresh, with an aqueous solution comprising water, an inorganic acid substantially free of chloride and aluminum. The acid is preferably sulfurous or sulfuric acid. The aluminum is provided by an aluminum source selected from the group consisting of the alumina trihydrates and aluminum oxide. Chloride contamination of the aluminum source should be minimal, preferably less than about 1000 ppm chloride, more preferably less than about 200 ppm chloride. The pH of the aqueous solution is adjusted to about 3–12 by the addition of a sufficient quantity of ammonium hydroxide. The FCC catalyst is added to this solution, preferably with stirring, in a weight ratio of about 1 part catalyst to about 1–10 parts water to prepare an aqueous slurry. Upon stabilization of the pH of the aqueous slurry, enhancement of the acid sites of the catalyst is achieved and the catalyst may be separated from the slurry and, if desired, washed. This simple, aqueous process reduces the level of many metal poisons on the FCC catalyst and produces a catalyst having an enhanced number of acid reaction sites.

24 Claims, 5 Drawing Sheets

METHODS FOR ENHANCING THE ACID SITES OF FCC CATALYSTS

BACKGROUND IN THE INVENTION

I. Field of the Invention

The present invention generally relates to methods for preparing fluid catalytic cracking (FCC) catalysts having enhanced acid sites. More specifically, the present invention is directed to aqueous methods for preparing improved FCC catalysts by contacting a catalyst with an aqueous solution including an aluminum source having specific characteristics and under specified conditions to enhance the acid sites of the catalyst.

II. Description of the Background

Catalytically controlled processes, including fluid catalytic cracking (FCC), are valuable refining processes employed to upgrade heavy hydrocarbons to higher valued products. In particular, the cracking of hydrocarbon feedstocks to produce hydrocarbons of preferred octane rating which boil in the gasoline range is widely practiced. This cracking uses a variety of solid catalysts typically comprising at least one synthetic crystalline material to give more valuable end products. Cracking is ordinarily employed to produce gasoline as the most valuable product. Cracking is generally conducted at temperatures of about 750–1100° F., preferably about 850–950° F. and at pressures up to about 2000 psig, preferably about atmospheric to about 100 psig. In cracking, the feedstock is usually a petroleum hydrocarbon fraction such as straight run or recycled gas oils or other normally liquid hydrocarbons boiling above the gasoline range.

Over 1100 tons per day of FCC catalyst is used worldwide in over 200 Fluid Catalytic Cracking Units (FCCUs). During the cracking reaction, the catalyst is contaminated by elements deposited from feedstocks. Some contaminants, like the alkali metals, deactivate the catalyst without changing the product distribution. Others, however, including iron, nickel, vanadium and copper, effectively poison the catalyst by altering the selectivity and activity of the cracking reactions if allowed to accumulate on the catalyst. A catalyst, so poisoned with these metals, produces a higher yield of coke and hydrogen at the expense of the more desirable gasolines and butanes. Examples of such poisoning may be found in U.S. Pat. No. 3,147,228 where the yield of desirable butanes, butylenes and gasoline dropped from about 59 to about 49 volume percent as the contamination of the catalyst with nickel and vanadium increased, from 55 ppm to 645 ppm nickel and 145 ppm to 1480 ppm vanadium. Because many cracking units are limited by coke burning or gas handling facilities, increased coke or gas yields require a reduction in conversion or throughput to stay within the unit capacity.

In FCCUs, the bulk of contaminant elements from the feedstock remain in the circulating catalyst system. Through the cycles of cracking, fresh catalyst deactivation is caused by contaminant blockage of active sites by metals, including nickel, vanadium, copper and iron. Deactivation may also occur as the result of steam catalyzed by contaminants such as vanadium and sodium. To compensate for decreased FCC feedstock conversion and product selectivity, a portion of the circulating equilibrium catalyst is regularly withdrawn and replaced by fresh catalyst added to the system. This withdrawn or spent catalyst contaminated with various metals must then be properly disposed of.

Both because of the expense involved in replacing spent catalyst with fresh catalyst and because of the expense involved with the environmentally safe disposal of metal-contaminated catalyst, there have been many efforts to demetallize and reuse the contaminated catalyst. In conventional demetallization processes, portions of the metal contaminants are removed from the spent FCC catalyst by pyrometallurgical methods, e.g., calcining, sulfiding, nitrogen stripping and chlorinating, followed by hydrometallurgical methods, e.g., leaching, washing and drying, to produce a demetallized spent catalyst for reuse in the FCCU. Such a demetallization (DEMET) process is described in U.S. Pat. No. 4,686,197, incorporated herein by reference. The '197 patent describes an improved demetallization process. Also referenced are prior demetallization processes which include the chlorination at elevated temperatures of alumina, silica alumina and silica catalysts contaminated with metals. See, for example, U.S. Pat. Nos. 3,150,104; 3,122,510; 3,219,586; and 3,182,025. Also referenced are demetallization processes which do not primarily involve chlorination of the catalyst. See, for example, U.S. Pat. Nos. 4,101,444; 4,163,709; 4,163,710; and 4,243,550.

Prior demetallization processes, such as the DEMET process described in the '197 patent have most frequently employed calcining and sulfiding steps performed at about 787° C. followed by chlorination at 343° C. The offgases from the reactor are scrubbed, while the removed contaminant metals are precipitated and filtered for disposal in the same manner used for spent catalyst or disposed through any acceptable Best Demonstrated Available Technology (BDAT) method for the recycling of metals.

The recycling of demetallized spent FCC catalyst has reduced the requirements for fresh catalyst additions, reduced the generation of catalyst fines and reduced the disposal problem of spent catalyst. Conventional demetallization processes remove contaminants known to be detrimental to conversion, to product selectivity and to the mechanical performance of the FCC.

While the DEMET process based upon the '197 patent and the prior processes described therein have provided methods for demetallization of spent FCC catalyst, those methods have not been entirely or universally acceptable. Operating conditions are severe and must be strictly maintained. Therefore, the process has found only limited use. For these and other reasons, there has been a long felt but unfulfilled need for a more economical, more efficient, easier and safer method for demetallizing FCC catalysts and for enhancing the acid sites thereon. The present invention solves those needs.

SUMMARY OF THE INVENTION

The present invention is directed to processes for enhancing the acid sites of fluid catalytic cracking (FCC) catalysts. More particularly, the invention is directed to aqueous processes for treating either spent or fresh FCC catalysts to enhance the acid sites, thus improving the catalyst reactivity and selectivity.

In the processes of the present invention, spent or fresh FCC catalyst is added to an aqueous solution to produce an aqueous slurry. The aqueous solution comprises water, an inorganic acid substantially free of chloride, preferably sulfurous or sulfuric acid, and aluminum. The aluminum is provided from an aluminum source selected from the group consisting of aluminum trihydroxide, alumina trihydrate, gibbsite and aluminum oxide and is characterized by a low level of chloride contamination. In fact, chloride contamination of the aluminum source should be not more than about 1000 ppm; preferably the aluminum source should have less than about 200 ppm chloride.

The aqueous solution preferably comprises equal parts sulfurous acid and aluminum where each is present in the range of about 0.1–3.0 percent-by-weight, preferably in the range of about 0.2–1.5 percent-by-weight, more preferably about 0.7–1.0 percent-by-weight, with respect to the solution. The pH of the solution should be in the range of about 3.0 to 12.0, preferably from about 3.25 to about 5.0, and is adjusted by the addition of a sufficient quantity of ammonium hydroxide to achieve the desired pH.

While the process is intended for the treatment of spent FCC catalyst, it has been found that fresh catalyst will also benefit from the process. The FCC catalyst is added to the aqueous solution in a weight ratio of about 1 part catalyst to 1–10 parts water, preferably in a ratio of about 1 part catalyst to about 4–10 parts water. In order to produce the desired aqueous slurry, catalyst is typically added to the aqueous solution with stirring.

The reaction proceeds quickly. Stirring of the slurry should be continued until the pH stabilizes. Upon stabilization of the pH, the enhanced catalyst is separated from the slurry and, if desired, washed with water. While washing is not necessary, it may be desirable to wash the separated catalyst with successive aliquots of wash water until the eluted wash water aliquot contains less than about 100 ppm chloride.

FCC catalysts, whether spent or fresh, treated by the forgoing process have been found to provide improved reactivity and selectivity, apparently as the result of added or enhanced acid sites made available for reaction on the catalyst surface. These improvements have been achieved without requiring the severe and expensive pyrometallurgical steps of conventional demetallization processes. However, the aqueous processes of the present invention may also be used to treat spent FCC catalysts which have previously been demetallized by conventional pyrometallurgical and/or hydrometallurgical processes. Thus, the long felt, but unfulfilled need for a more efficient demetallization process has been met.

The processes of the present invention produce improved catalysts exhibiting higher activity and higher stability than catalysts produced by prior processes. The catalysts produced by the present processes are more resistant to deactivation and show improved stability. Thus, the production of coke and hydrogen are both minimized and the throughput of the catalytic cracker can be increased. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed description in connection with the accompanying drawings, wherein:

FIG. 1 illustrates total conversion;

FIG. 2 illustrates gasoline ($C_5$+at 221° C.);

FIG. 3 illustrates coke;

FIG. 4 illustrates the ratio of gasoline to coke;

FIG. 5 illustrates kinetic (second order) conversion;

FIG. 6 illustrates dynamic activity (the ratio of kinetic conversion to coke);

FIG. 7 illustrates the ratio of dry gas to kinetic conversion;

FIG. 8 illustrates the ratio of gasoline to total conversion; and

FIG. 9 illustrates the ratio of LCO (221–343° C.) to LCO+slurry (>343° C.).

Figure 1:
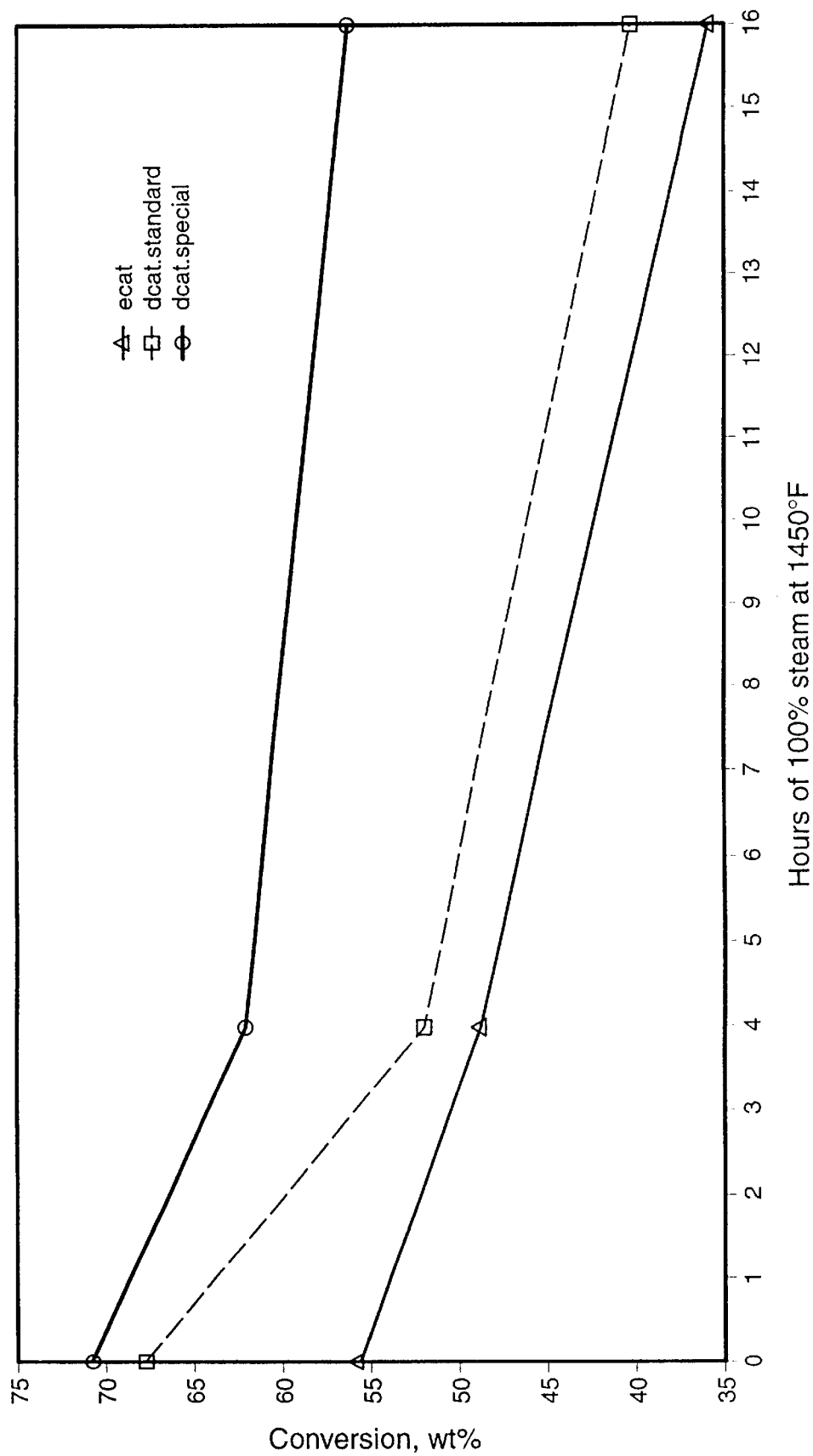
FIGS. 1–9 are graphical representations of the data of Tables 2–4 illustrating the significant improvement in hydrothermal stability and catalyst conversion achieved using the methods of the present invention. The graphs compare catalysts prepared in accord with the present invention with equilibrium catalyst and equilibrium catalyst subjected to a conventional demetallization process. Illustrated are the results achieved with catalysts prior to steaming and after steaming for both 4 hours and 16 hours with 100% steam at 1450° F.

While the invention will be described in connection with the presently preferred embodiments, it will be understood that it is not intended to limit the invention to those embodiments. On the contrary, it is intended to cover all alternatives, modifications and equivalents as may be included in the spirit of the invention as defined in the appended claims.

DETAILED DESCRIPTION OF THE PREFERRED EMBODIMENTS

The present invention provides improved methods for enhancing the acid sites of fluid catalytic cracking (FCC) catalysts, particularly spent catalysts. In the methods of the present invention, the FCC catalyst is treated in an aqueous solution including an inorganic acid and an aluminum source having less than about 1000 ppm chloride as a trace element under specified conditions.

In the methods of the present invention, an aqueous solution comprising water, about 0.1–3.0 percent-by-weight inorganic acid and about 0.1–3.0 percent-by-weight aluminum is prepared. Preferably the solution comprises 0.2–1.5 percent-by-weight acid and aluminum. More preferably both the acid and aluminum are present in a concentration of about 0.7–1.0 precent-by-weight, most preferably at about 8000 ppm.

While the acid may be any inorganic acid substantially free of chloride, it is preferably selected from the group consisting of sulfurous and sulfuric acids, and most preferably, comprises sulfurous acid. The aluminum is provided by an aluminum source selected from the group consisting of the aluminum trihydrates and aluminum oxide and, further, should be characterized by a low chloride level, preferably less than about 1000 ppm chloride as a trace constituent. The aluminum trihydrates include gibbsite alumina, boehmite alumina, bayerite alumina, diaspore alumina and derivatives thereof. The preferred aluminum source is alumina trihydrate, most preferably gibbsite alumina, and contains less than about 200 ppm chloride as a trace constituent.

In the process of the present invention, the pH of the aqueous solution of acid and aluminum is adjusted to about 3–12, most preferably to about 3.25–5.0 by the addition of ammonium hydroxide. While it is preferred that the pH be adjusted before the addition of catalyst to the solution, in an alternative method the catalyst may be added before the pH adjustment.

The FCC catalyst is added to the pH adjusted aqueous solution in a weight ratio of about one part catalyst to about 1–10 parts water to produce an aqueous slurry. In the more preferred methods of the present invention, the ratio of catalyst to water is about I part catalyst to about 4–10 parts water.

While it has been found that the acid sites of fresh catalyst may be improved by the methods of the present invention, the present invention is particularly useful for the processing of spent catalyst. While it is not necessary to treat a spent catalyst by conventional pyrometallurgical or hydrometallurgical demetallization processes, e.g., by processes such as those disclosed in U.S. Pat. No. 4,686,197 which is incorporated herein by reference, the present methods may be used to further enhance the acid sites of spent catalysts which have been so treated.

After the addition of catalyst to the pH adjusted aqueous solution, the resulting slurry should be stirred or otherwise mixed for a time sufficient for the pH of the solution to stabilize. Stabilization will typically occur in a pH range of about 3.25 to 5.0. The pH may be monitored by any conventional means, e.g., a standard pH probe. Stabilization of the pH typically occurs after stirring for a time of about 1–10 minutes, commonly about 3–5 minutes. It has been found that additional stirring after stabilization of the pH provides no significant additional improvement in the results achieved.

After the pH of the aqueous slurry has stabilized, the treated catalyst may be separated from the aqueous solution by any conventional means, e.g., filtration. While washing of the filtered catalyst has been found to be unnecessary, the filtered catalyst, if desired, may be washed with water, preferably until the eluted wash water shows less than about 100 ppm chloride.

The foregoing method significantly enhances the acid sites of FCC catalysts, particularly spent catalyst. FCC catalysts, whether spent or fresh, treated in accord with the foregoing procedure show higher activity and higher stability than untreated catalysts or spent catalysts treated by prior processes.

The foregoing method will now be described in connection with several specific examples. The following specific examples illustrate the methods of the foregoing process and provide illustrative examples of the improved results achieved therewith.

CATALYST TREATMENT PROCEDURE

An aqueous solution containing sulfurous acid and aluminum was prepared by adding to a clean beaker 2400 ml of water and a stirring bar. With constant stirring, 324 ml of sulfurous acid (6% percent acid) and 21 grams of aluminum trihydroxide were added. The resulting aqueous solution was stirred for five minutes or until the aluminum was dissolved. The pH of the solution was raised to about 5.0 by the addition of ammonium hydroxide while continuing to stir. To the pH adjusted solution was added 300 grams of catalyst with continuous stirring to produce an aqueous slurry. The pH of the aqueous slurry was monitored and, upon stabilization of the pH, the slurry was filtered to separate the treated catalyst from the aqueous solution. The filtered, treated catalyst was washed with two successive washes, each comprising about 1200 ml of water.

A variety of catalysts have been treated with the foregoing process. Those catalysts included fresh catalyst (FCAT) and equilibrium spent catalyst (ECAT) from several different sources. These treated catalysts, along with comparisons of untreated fresh and spent catalyst and catalyst treated by conventional DEMET procedures were tested to predict performance.

The expected performance of catalysts treated by the foregoing procedure have been determined using conventional micro activity testing (MAT) and steaming conditions which are known and used by those of skill in the art to test fresh, spent and demetallized catalysts. In these procedures, catalyst was treated with 100 percent steam at temperature of about 787° C. (1450° F.). A comparison of the results before steaming and after 4 hours of steaming to provides an indication of the hydrothermal stability of the catalyst. In addition to those steaming conventional results, Applicant has employed a more rigorous test by continuing to steam the catalyst for 16 hours. Alternative tests which could be used for the same determination include fixed fluid bed, FCCU pilot plant, modified MAT and cyclic deactivation testing.

It has been found that a catalyst which can survive the severity of temperature, steam and time in the foregoing MAT test would be expected to perform relatively the same in cyclic deactivation or pilot plant testing. Accordingly, in order to provide an indication of catalyst stability, conventional steaming and MAT tests including both 4 hour and 16 hour steaming conditions, controls.

Steaming, MAT and x-ray diffraction (XRD) tests were performed on catalysts treated in accord with the foregoing procedure by standard ASTM procedures. Steaming was performed at 787° C. (1450° F.) with 100 percent steam for 4 hours and 16 hours. Results prior to steaming, after 4 hours steaming and after 16 hours steaming are summarized in the following tables and illustrated in the accompanying figures. Also included in those tables are results achieved with similar catalysts treated by conventional demetallization techniques, e.g., the DEMET process described in U.S. Pat. No. 4,686,197.

Table 1 illustrates the improved removal of metal contaminants on the catalyst achieved using the present invention as compared to that achieved using conventional demetallization processes. Also presented for comparison is the metal content of fresh catalyst.

TABLE 1

| | Metal analysis by XRD (ppm) | | | | | |
|---|---|---|---|---|---|---|
| | Fresh Catalyst | ECAT without DEMET | ECAT after Standard DEMET | Demetallized ECAT with Enhanced Acid Sites | Metal removal from base ECAT (weight percent removed) | |
| Nickel | 26 | 4610 | 269 | 303 | 93.58 | 93.43 |
| Vanadium | 60 | 5790 | 1880 | 959 | 67.53 | 83.44 |
| Barium | 139 | 196 | 150 | 152 | 23.47 | 22.45 |
| Calcium | 564 | 454 | 435 | 374 | 4.19 | 17.62 |
| Chromium | 29 | 99 | 52 | 51 | 30.18 | 48.29 |
| Cobalt | 49 | 233 | 67 | 58 | 71.24 | 74.94 |
| Copper | 5 | 22 | 9 | 9 | 59.05 | 59.05 |
| Iron | 3650 | 4990 | 2330 | 1120 | 53.31 | 77.56 |
| Lead | 27 | 38 | 23 | 10 | 39.84 | 73.70 |
| Potassium | 826 | 516 | 460 | 402 | 10.85 | 22.09 |
| Titanium | 5010 | 7880 | 3350 | 3340 | 57.49 | 57.61 |
| Zinc | 33 | 80 | 51 | 43 | 36.02 | 46.58 |

In every case the removal of metal by the present method was equal to or better than that achieved with the standard demetallization methods. Of particular significance is the removal of nickel (>93%) and the removal of Vanadium (>83%). In fact, removal of Vanadium is significantly better with the methods of the present invention.

Tables 2–4 and FIGS. 1–9 illustrate the significant improvement in conversion achieved using the present invention. Again, fresh catalyst is presented for comparison.

TABLE 2

Fresh, Equilibrium, and Demetallized Equilibrium Catalysts, catalyst quality before steaming, MAT, wt %

| MAT yields before steaming | Fresh Catalyst | ECAT without DEMET | ECAT after Standard DEMET | Demetallized ECAT with Enhanced Acid Sites |
|---|---|---|---|---|
| Conversion | 94.29 | 55.55 | 67.74 | 70.78 |
| Kinetic Conversion | 16.50 | 1.25 | 2.10 | 2.42 |
| Gasoline/Conversion | 0.27 | 0.63 | 0.56 | 0.54 |
| Kin. Conv./Coke | 0.79 | 0.15 | 0.24 | 0.21 |
| Gasoline/Coke | 1.22 | 4.11 | 4.36 | 3.32 |
| Dry Gas/Kin. Conv. | 0.38 | 1.55 | 1.23 | 1.03 |
| LCO/LCO + Slurry | 0.47 | 0.52 | 0.60 | 0.63 |
| H2 | 0.29 | 0.46 | 0.26 | 0.46 |
| CI | 2.50 | 0.60 | 0.98 | 0.74 |
| C2 | 1.94 | 0.56 | 0.62 | 0.62 |
| C2 = | 1.78 | 0.77 | 0.97 | 1.13 |
| Dry Gas (CI + C2s) | 6.22 | 1.93 | 2.57 | 2.49 |
| C3 | 17.06 | 0.85 | 2.30 | 1.74 |
| C3 = | 2.17 | 2.74 | 4.34 | 4.84 |
| Total C3s | 19.23 | 3.49 | 6.64 | 6.58 |
| IC4 | 14.36 | 2.28 | 6.17 | 5.60 |
| NC4 | 6.65 | 0.56 | 1.35 | 1.22 |
| Isobutene | 0.39 | 0.93 | 0.96 | 1.17 |
| Total butenes | 1.20 | 3.24 | 3.91 | 4.51 |
| Total C4s | 22.21 | 6.08 | 11.43 | 11.33 |
| Total LPG | 41.44 | 9.67 | 18.07 | 17.91 |
| GSL (C5-221° C.) | 25.41 | 34.98 | 38.10 | 38.34 |
| LCO (221–343° C.) | 2.66 | 22.94 | 19.36 | 18.55 |
| SLURRY (343° C.+) | 3.05 | 21.51 | 12.91 | 10.68 |
| COKE | 20.91 | 8.51 | 8.74 | 11.56 |

TABLE 3

Fresh, Equilibrium, and Demetallized Equilibrium Catalysts, catalyst quality after 4 hours steaming, MAT, wt %

| MAT yields after 4 hrs 100% steam at 787° C. | Fresh Catalyst | ECAT without DEMET | ECAT after Standard DEMET | Demetallized ECAT with Enhanced Acid Sites |
|---|---|---|---|---|
| Conversion | 64.53 | 48.33 | 52.06 | 62.10 |
| Kinetic Conversion | 1.82 | 0.94 | 1.06 | 1.63 |
| Gasoline/Conversion | 0.63 | 0.61 | 0.68 | 0.63 |
| Kin. Conv./Coke | 0.37 | 0.12 | 0.28 | 0.30 |
| Gasoline/Coke | 6.66 | 3.68 | 9.33 | 7.24 |
| Dry Gas/Kin. Conv. | 1.44 | 1.89 | 1.72 | 1.24 |
| LCO/LCO + Slurry | 0.58 | 0.46 | 0.51 | 0.55 |
| H2 | 0.08 | 0.72 | 0.30 | 0.21 |
| CI | 0.32 | 0.63 | 0.60 | 0.64 |
| C2 | 0.63 | 0.55 | 0.63 | 0.60 |
| C2 = | 0.77 | 0.60 | 0.59 | 0.79 |
| Dry Gas (CI + C2s) | 2.62 | 1.78 | 1.82 | 2.03 |
| C3 | 1.63 | 0.63 | 0.76 | 1.13 |
| C3 = | 4.19 | 2.49 | 3.05 | 4.40 |
| Total C3s | 5.82 | 3.12 | 2.81 | 4.53 |
| IC4 | 4.64 | 1.29 | 2.35 | 2.54 |
| NC4 | 1.04 | 0.36 | 0.47 | 0.51 |
| Isobutene | 1.00 | 1.19 | 1.32 | 1.62 |
| Total butenes | 4.28 | 3.41 | 3.98 | 5.45 |
| Total C4s | 9.96 | 5.06 | 6.80 | 8.50 |
| Total LPG | 15.78 | 8.18 | 10.61 | 12.03 |
| GASOLINE | 40.56 | 29.60 | 35.53 | 39.18 |
| LCO | 20.67 | 23.61 | 24.26 | 20.70 |
| SLURRY | 14.79 | 28.07 | 23.68 | 17.21 |
| COKE | 6.09 | 8.05 | 3.81 | 5.41 |

TABLE 4

Fresh, Equilibrium, and Demetallized Equilibrium Catalysts, catalyst quality after 16 hours steaming, MAT, wt %

| MAT yields after 16 hrs 100% steam at 787° C. | Fresh Catalyst | ECAT without DEMET | ECAT after Standard DEMET | Demetallized ECAT with Enhanced Acid Sites Example 1 |
|---|---|---|---|---|
| Conversion | 62.91 | 35.86 | 40.38 | 56.56 |
| Kinetic Conversion | 1.70 | 0.56 | 0.68 | 1.30 |
| Gasoline/Conversion | 0.66 | 0.56 | 0.65 | 0.68 |
| Kin. Conv./Coke | 0.37 | 0.07 | 0.14 | 0.45 |
| Gasoline/Coke | 9.09 | 2.44 | 5.43 | 13.45 |
| Dry Gas/Kin. Conv. | 1.11 | 2.98 | 2.55 | 1.37 |
| LCO/LCO + Slurry | 0.68 | 0.33 | 0.37 | 0.52 |
| H2 | 0.07 | 0.64 | 0.34 | 0.21 |
| CI | 0.58 | 0.51 | 0.88 | 0.56 |
| C2 | 0.60 | 0.59 | 0.47 | 0.57 |
| C2 = | 0.70 | 0.57 | 0.37 | 0.66 |
| Dry Gas (CI + C2s) | 1.88 | 1.67 | 1.73 | 1.78 |
| C3 | 1.19 | 1.01 | 0.66 | 0.79 |
| C3 = | 4.21 | 1.73 | 2.21 | 3.97 |
| Total C3s | 5.40 | 2.74 | 2.87 | 4.76 |
| IC4 | 3.94 | 0.54 | 0.95 | 2.54 |
| NC4 | 0.83 | 0.19 | 0.28 | 0.51 |
| Isobutene | 1.17 | 0.63 | 1.19 | 1.99 |
| Total butenes | 4.77 | 1.63 | 3.17 | 5.70 |
| Total C4s | 9.54 | 2.36 | 4.40 | 8.75 |
| Total LPG | 14.94 | 5.11 | 7.87 | 13.51 |
| GASOLINE | 41.47 | 20.18 | 26.22 | 38.20 |
| LCO | 22.47 | 20.89 | 21.92 | 22.47 |
| SLURRY | 15.73 | 43.25 | 37.70 | 20.98 |
| COKE | 4.56 | 8.28 | 4.83 | 2.87 |

Figure 2:
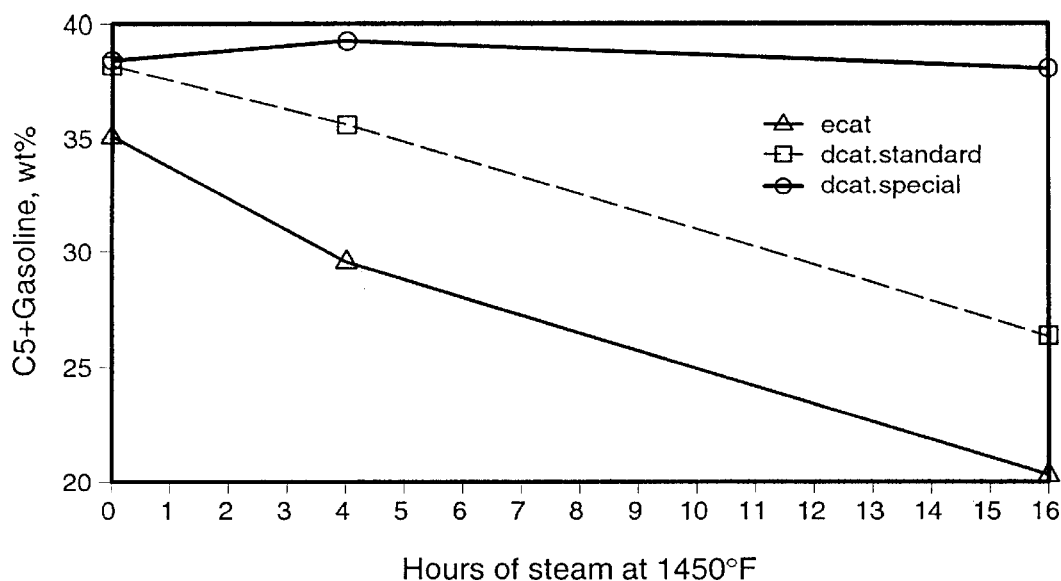
Figure 3:
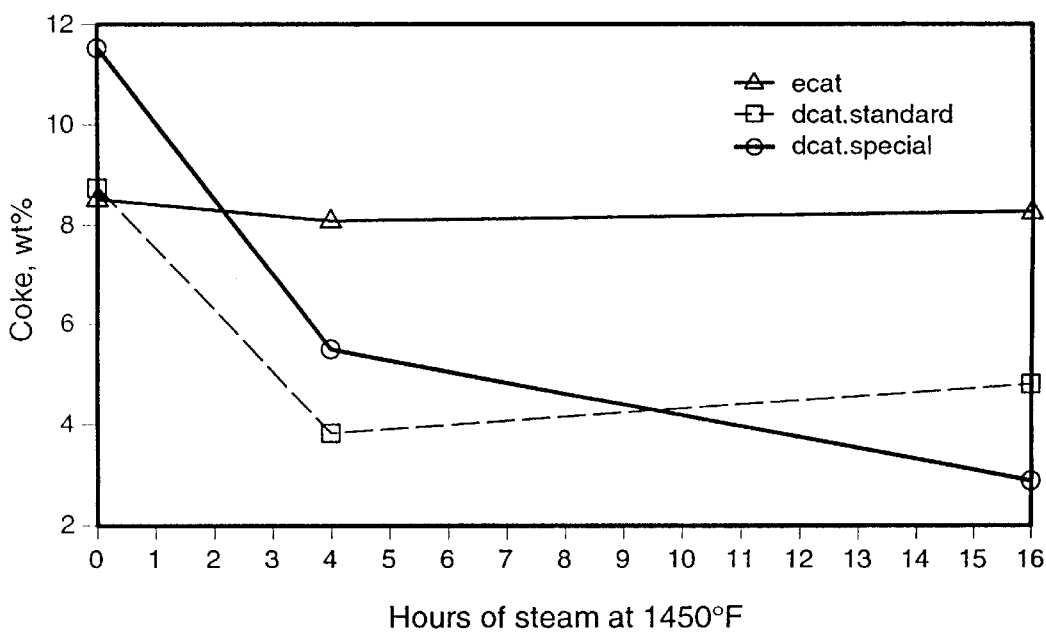
Figure 4:
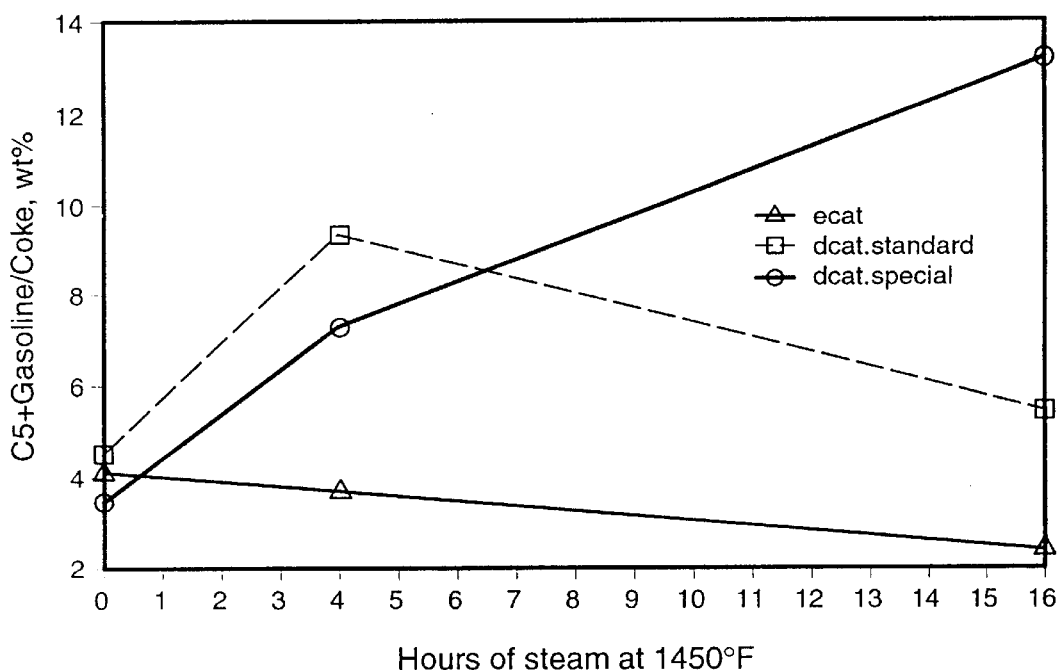
Figure 5:
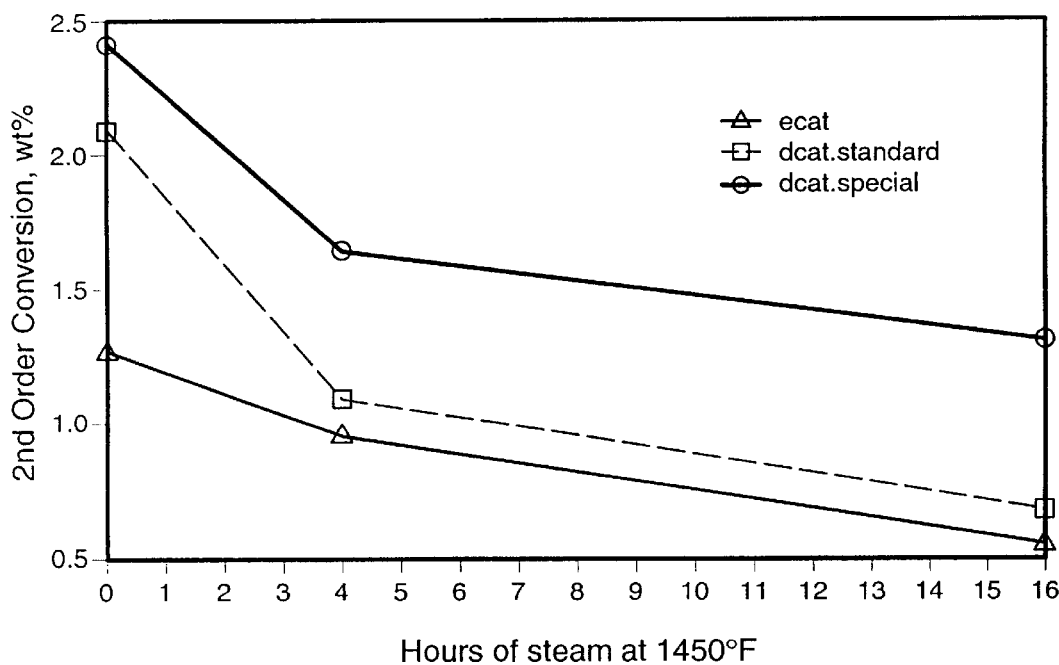
Figure 6:
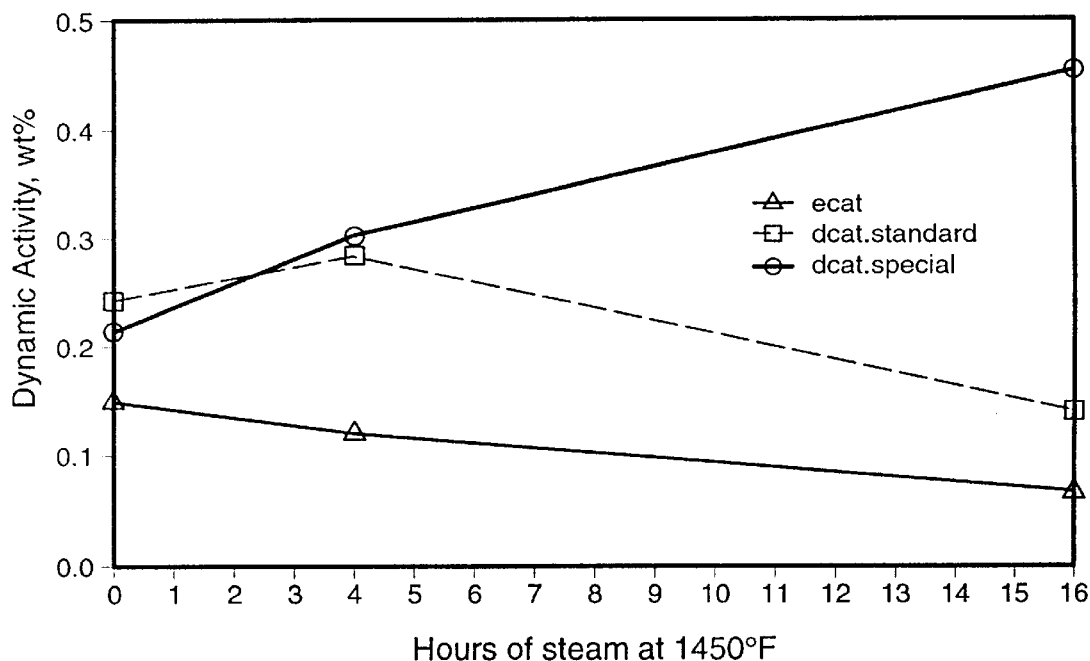
Figure 7:
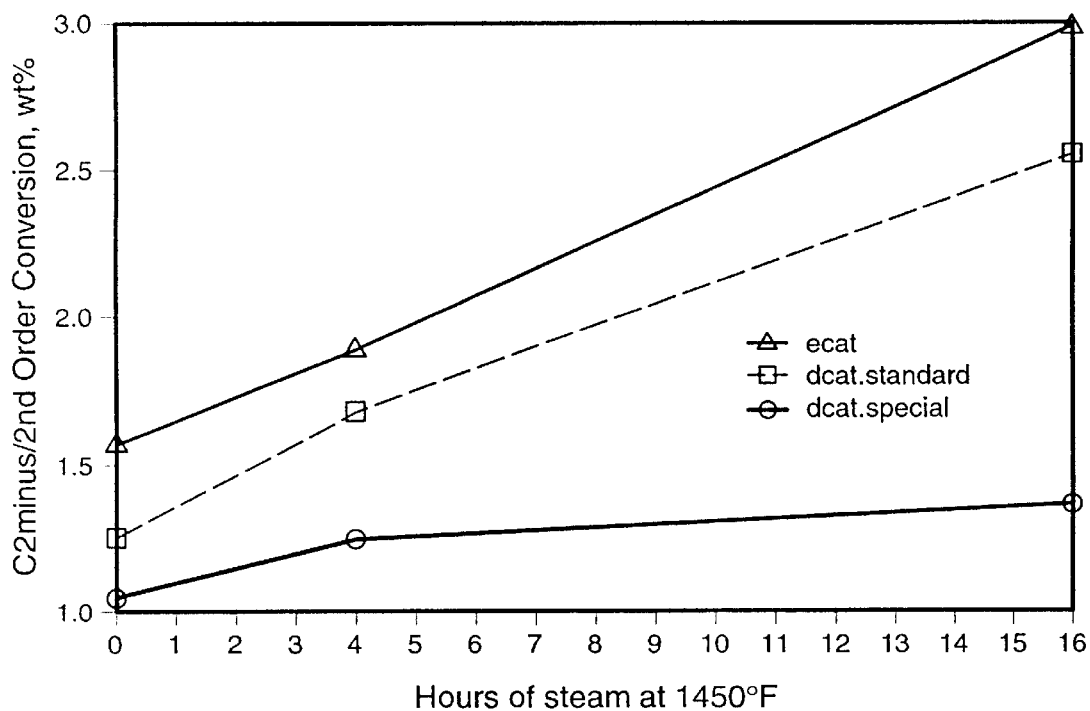
Figure 8:
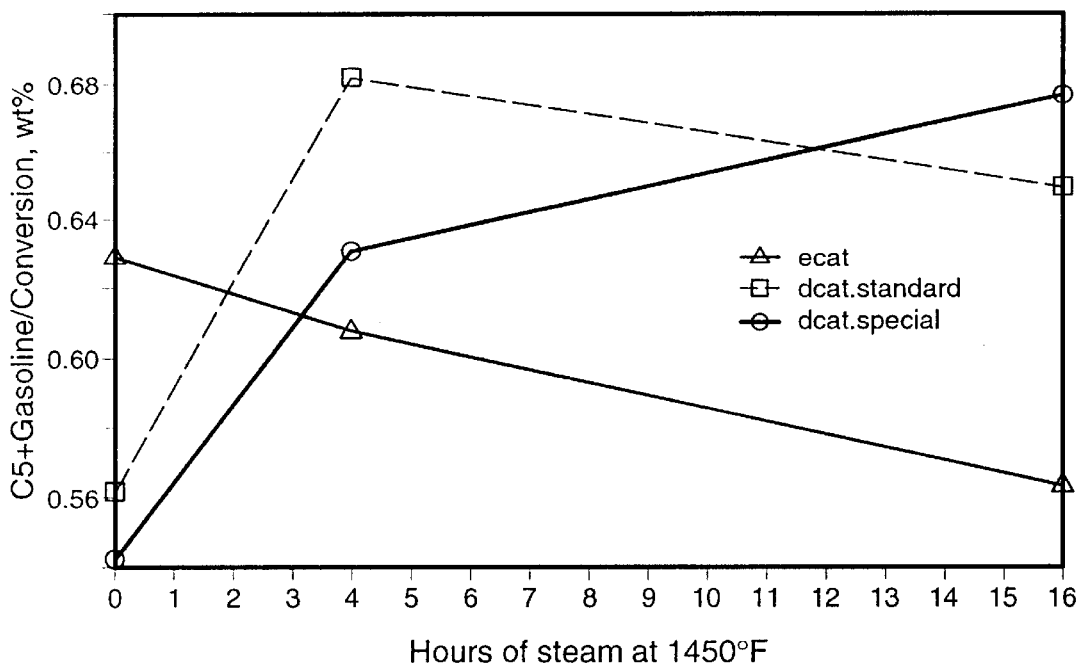
Figure 9:
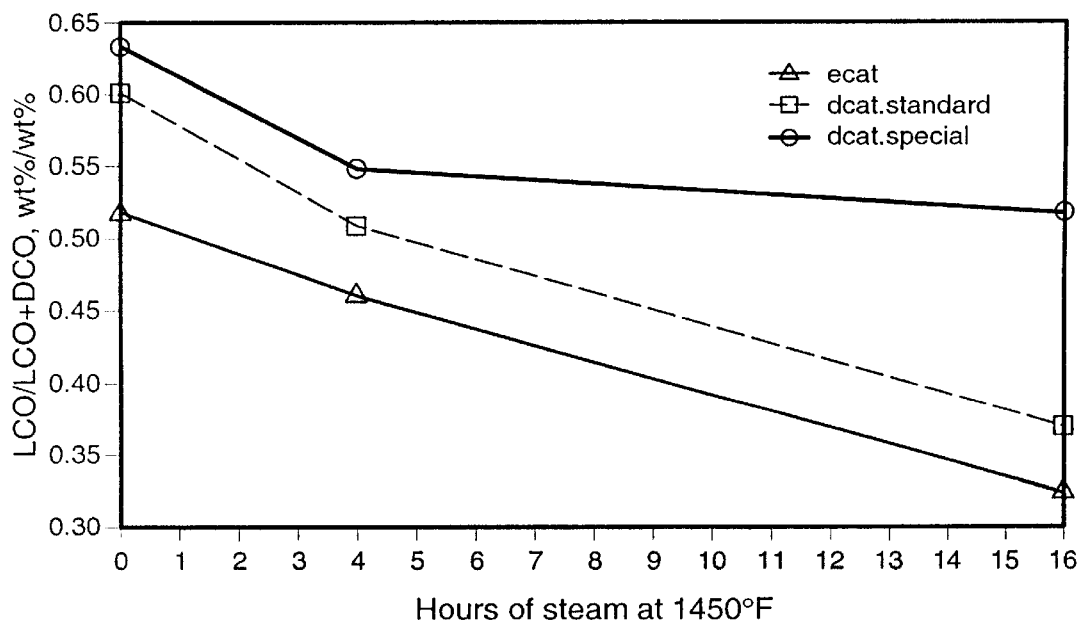

The data summarized in the foregoing tables is visually illustrated for better understanding in FIGS. 1–9. These figures illustrate that catalysts treated in accord with the present invention provide superior results when compared with both equilibrium catalysts and equilibrium catalysts treated with conventional demetallization techniques. Of particular significance is the improved hydrothermal stability illustrated by the superior results achieved after steaming for 4 and 16 hours. FIGS. 1 and 2 illustrate the significant improvement achieved in total conversion and conversion to gasoline, while FIG. 3 illustrates the desirable reduction in coke production. FIG. 4 illustrates, particularly at 16 hours, the significant improvement in the ratio of gasoline to coke produced with catalysts treated in accord with the present invention. FIGS. 5 and 6 illustrate that catalysts treated in accord with the present invention exhibit consistently better kinetic conversion and dynamic activity, respectively, than equilibrium catalysts or conventionally demetallized catalysts. FIGS. 7–9 further illustrate the improved results achieved with the present invention.

Little difference in expected performance is observed between a catalyst treated in accord with the present invention after steaming for sixteen hours and for a conventional demetallized catalyst with no steaming. Conversion after steaming for sixteen hours is significantly higher for a catalyst treated by the present method than that expected by a catalyst prepared by conventional demetallization methods. Thus, it is seen that the methods of the present invention provide significant improvement in catalyst stability.

Deactivation rate can be calculated by a variety of methods. For the simple purposes of comparing fresh, spent and demetallized spent catalyst, the deactivation rate is calculated as the loss of conversion per hour of steaming.

Table 5 illustrates the improved deactivation rates achieved using catalysts treated in accord with the present invention.

TABLE 5

Fresh, Equilibrium and Demetallized Equilibrium Catalysts,
Deactivation and Activity Recovery Calculations, MAT, wt %

| 100% steam at 787° C. | Hours Steam | Fresh Catalyst | ECAT without DEMET | ECAT after Standard DEMET | Demetallized ECAT with Enhanced Acid Sites |
|---|---|---|---|---|---|
| Conversion | 0 | 94.29 | 55.55 | 67.74 | 70.78 |
| Conversion | 4 | 64.53 | 48.33 | 52.06 | 62.10 |
| Conversion | 16 | 62.91 | 35.86 | 40.38 | 56.56 |
| Deactivation rate (wt %/hour) | | | | | |
| from 0 to 4 hours steam | | 7.44 | 1.71 | 3.27 | 2.17 |
| from 4 to 16 hours steam | | 0.13 | 1.07 | 0.39 | 0.46 |
| from 0 to 16 hours steam | | 1.96 | 1.23 | 1.11 | 0.89 |
| Conversion | 0 | 0.00 | 38.73 | 29.88 | 26.54 |
| Deactivation from | 4 | 0.00 | 15.80 | 13.19 | 12.47 |
| Fresh minus other | 16 | 0.00 | 27.05 | 16.26 | 22.53 |
| Activity above ECAT | 0 | 38.73 | 0.00 | 8.85 | 12.19 |
| MAT Conversion | 4 | 15.80 | 0.00 | 2.61 | 3.33 |
| Other minus ECAT | 16 | 27.05 | 0.00 | 10.79 | 4.52 |
| Activity recovery as | 0 | 100% | 0% | 22.85% | 39.32% |
| a percent of difference | 4 | 100% | 0% | 16.52% | 84.56% |
| Fresh minus ECAT | 16 | 100% | 0% | 39.89% | 76.52% |
| Average activity recovery | | 100% | 0% | 26.42% | 66.80% |

The deactivation rate of catalysts with enhanced acid sites prepared by the methods of the present invention is half that of fresh catalyst, significantly less than that for equilibrium catalyst and less than that for catalyst treated with standard demetallization processes.

In summary, it is believed that contaminating metals block the pores of the catalyst, thus preventing access to active sites. The processes of the present invention have been shown to recover as much as sixty-seven percent of the maximum possible activity compared to recovery of only twenty-six percent for conventional demetallization processes. The combination of low deactivation rates and higher MAT conversions suggest that catalysts treated in accord with the present invention will be superior to those recovered by standard demetallization techniques in commercial applications. Thus, lower quantities of fresh catalyst will be required to maintain FCC unit activity and throughput.

The foregoing description has been directed in primary part to a particular preferred embodiment in accordance with the requirements of the Patent Statutes and for purpose of explanation and illustration. It will be apparently, however, to those skilled in the art that many modifications and changes in the specifically described methods may be made without departing from the true spirit and scope of the invention. For example, the order of steps in the method may be adjusted. For example, while it is preferred that the pH of the aqueous solution be adjusted before addition of catalyst, it is has been found that acceptable results may be achieved by adding catalyst to the aqueous solution prior to the adjustment of the pH by the addition of ammonium hydroxide. Therefore, the invention is not restricted to the preferred embodiment described and illustrated, but covers all modifications which may fall within the scope of the following claims.

What is claimed is:

1. An aqueous process for enhancing the acid sites of a spent fluid catalytic cracking (FCC) catalyst, comprising the steps of:

preparing an aqueous solution comprising water, about 0.1–3.0 percent-by-weight acid selected from the group consisting of sulfurous and sulfuric acid and about 0.1–3.0 percent-by-weight aluminum provided by an aluminum source selected from the group consisting of the alumina trihydrates and aluminum oxides where said aluminum source has less than about 1,000 ppm chloride as a trace constituent;

adding to said solution a sufficient quantity of ammonium hydroxide to adjust the pH of said solution to about 3.0–12.0;

adding a spent FCC catalyst to said solution in a weight ratio of about 1 part catalyst to about 1–10 parts water to produce an aqueous slurry;

stirring said slurry for a time sufficient for the pH of said slurry to stabilize; and separating said catalyst from said slurry.

2. The process of claim 1 wherein said ammonium hydroxide is added to said solution in a quantity sufficient to adjust the pH of said solution to about 3.25–5.0.

3. The process of claim 2 wherein the concentration of said acid and said aluminum in said aqueous solution is each about 0.2–1.5 percent-by-weight.

4. The process of claim 1 wherein said catalyst is added to said solution before the pH is adjusted by adding said ammonium hydroxide.

5. The process of claim 4 wherein said ammonium hydroxide is added to said solution in a quantity sufficient to adjust the pH of said solution to about 3.25–5.0.

6. The process of claim 5 wherein said slurry is stirred for a time of about 3–5 minutes.

7. The process of claim 1 wherein said aluminum source has less than about 200 ppm chloride as a trace constituent.

8. The process of claim 1 further comprising prior to adding said spent catalyst to said aqueous solution subjecting said spent catalyst to a demetallization process selected from the processes consisting of pyrometallurgical, hydrometallurgical and both processes.

9. The process of claim 1 wherein the weight ratio of catalyst to water is about 1 part catalyst to about 4–10 parts water.

10. The process of claim 1 wherein said aluminum source is alumina trihydrate.

11. The process of claim 10 wherein said aluminum source is selected from the group consisting of gibbsite, boehmite, bayerite, diaspore and derivatives thereof.

12. The process of claim 1 wherein said separated catalyst is washed with water.

13. The process of claim 12 wherein said wash is repeated until the eluted wash water has less than about 100 ppm chloride.

14. An aqueous process for enhancing the acid sites of a spent fluid catalytic cracking (FCC) catalyst, comprising the steps of:
   preparing an aqueous solution comprising water, about 0.7–1.0 percent-by-weight sulfurous acid and about a 0.7–1.0 percent-by-weight aluminum wherein said aluminum is provided by an aluminum source selected from the group consisting of aluminum trihydroxide, alumina trihydrate, gibbsite and aluminum oxides having less than about 1,000 ppm chloride as a trace constituent;
   adding to said solution a sufficient quantity of ammonium hydroxide to adjust the pH of said solution to about 3.25–5.0;
   adding said spent FCC catalyst to said solution in a weight ratio of about 1 part catalyst to about 4–10 parts water in said solution to produce an aqueous slurry;
   stirring said slurry for a time sufficient for the pH of said slurry to stabilize; and
   separating said catalyst from said slurry.

15. The process of claim 14 wherein said concentration of sulfurous acid and aluminum in said aqueous solution is about 0.8 percent-by-weight and the ratio of said catalyst to said water is about 1 to 8.

16. The process of claim 15 wherein said aluminum source has less than about 200 ppm chloride as a trace constituent.

17. The process of claim 16 further comprising prior to adding said spent catalyst to said aqueous solution subjecting said spent catalyst to a demetallization process selected from the processes consisting of pyrometallurgical, hydrometallurgical and both processes.

18. An aqueous process for enhancing the acid sites of a fluid catalytic cracking (FCC) catalyst, comprising the steps of:
   preparing an aqueous solution comprising water, about 0.1–3.0 percent-by-weight inorganic acid substantially free of chloride about a 0.1–3.0 percent-by-weight aluminum provided by an aluminum source selected from the group consisting of the alumina trihydrates and aluminum oxide having less than about 1,000 ppm chloride as a trace constituent;
   adding to said solution a sufficient quantity of ammonium hydroxide to adjust the pH of said solution to about 3.0–12.0;
   adding an FCC catalyst to said solution in a weight ratio of about 1 part catalyst to about 1–10 parts water to produce an aqueous slurry;
   stirring said slurry for a time sufficient for the pH of said slurry to stabilize; and
   separating said catalyst from said slurry.

19. The process of claim 18 wherein said ammonium hydroxide is added in a sufficient quantity to adjust the pH of said solution to about 3.25–5.0.

20. The process of claim 18 wherein said catalyst is added to said solution before the pH is adjusted by adding said ammonium hydroxide.

21. The process of claim 18 wherein said aluminum source is alumina trihydrate.

22. The process of claim 18 wherein said alumina source is selected from the group consisting of gibbsite, boehmite, bayerite, diaspore and derivatives thereof.

23. The process of claim 18 wherein said aluminum source has less than about 200 ppm chloride as a trace constituent.

24. The process of claim 18 wherein said catalyst is selected from the group consisting of fresh catalyst and spent catalyst.

* * * * *